(12) United States Patent
Akidau et al.

(10) Patent No.: US 12,130,795 B2
(45) Date of Patent: *Oct. 29, 2024

(54) STREAMS USING PERSISTENT TABLES

(71) Applicant: Snowflake Inc., Bozeman, MT (US)

(72) Inventors: Tyler Arthur Akidau, Seattle, WA (US); Istvan Cseri, Seattle, WA (US); Tyler Jones, Redwood City, CA (US); Daniel E. Sotolongo, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,322

(22) Filed: Jul. 26, 2023

(65) Prior Publication Data

US 2023/0367757 A1 Nov. 16, 2023

Related U.S. Application Data

(63) Continuation of application No. 17/648,622, filed on Jan. 21, 2022, now Pat. No. 11,748,327.

(60) Provisional application No. 63/143,184, filed on Jan. 29, 2021.

(51) Int. Cl.
*G06F 16/22* (2019.01)
*G06F 16/23* (2019.01)
*G06F 16/2455* (2019.01)

(52) U.S. Cl.
CPC ...... *G06F 16/2282* (2019.01); *G06F 16/2358* (2019.01); *G06F 16/24568* (2019.01)

(58) Field of Classification Search
CPC ............. G06F 16/2282; G06F 16/2358; G06F 16/24568; G06F 16/22
See application file for complete search history.

(56) References Cited

U.S. PATENT DOCUMENTS

| | | | |
|---|---|---|---|
| 6,032,158 A | 2/2000 | Mukhopadhyay et al. |
| 9,223,822 B1 | 12/2015 | Vipul et al. |
| 9,886,490 B1 | 2/2018 | Kapoor et al. |
| 11,126,505 B1 | 9/2021 | Vig et al. |
| 2003/0195886 A1 | 10/2003 | Vishlitzky et al. |
| 2010/0070536 A1 | 3/2010 | Merritt |
| 2011/0191299 A1 | 8/2011 | Huynh et al. |
| 2012/0158642 A1 | 6/2012 | Ebrahimi et al. |
| 2014/0164409 A1 | 6/2014 | Johnson et al. |
| 2017/0060695 A1 | 3/2017 | Clare et al. |
| 2018/0096001 A1 | 4/2018 | Soza |
| 2019/0065322 A1 | 2/2019 | Chakankar et al. |
| 2020/0364240 A1 | 11/2020 | Martin et al. |
| 2021/0089550 A1 | 3/2021 | Karl et al. |

(Continued)

OTHER PUBLICATIONS

"U.S. Appl. No. 17/648,622, Final Office Action mailed Sep. 7, 2022", 27 pgs.

(Continued)

*Primary Examiner* — Robert W Beausoliel, Jr.
*Assistant Examiner* — Mohammad S Bhuyan
(74) *Attorney, Agent, or Firm* — Schwegman Lundberg & Woessner, P.A.

(57) ABSTRACT

A system or persistent table may be generated storing changelog information of a primary base table. The system table may then be used to create streams of relevant information. In some examples, the streams may read from the system table for information past a retention period of the primary table while reading from the primary table information in the retention period.

18 Claims, 11 Drawing Sheets

(56) References Cited

U.S. PATENT DOCUMENTS

2022/0245117 A1  8/2022  Akidau et al.

OTHER PUBLICATIONS

"U.S. Appl. No. 17/648,622, Non Final Office Action mailed Mar. 28, 2022", 29 pgs.

"U.S. Appl. No. 17/648,622, Non Final Office Action mailed Dec. 15, 2022", 30 pgs.

"U.S. Appl. No. 17/648,622, Notice of Allowance mailed Apr. 26, 2023", 7 pgs.

"U.S. Appl. No. 17/648,622, Response filed Mar. 15, 2023 to Non Final Office Action mailed Dec. 15, 2022", 9 pgs.

"U.S. Appl. No. 17/648,622, Response filed Jun. 28, 2022 to Non Final Office Action mailed Mar. 28, 2022", 8 pgs.

"U.S. Appl. No. 17/648,622, Response filed Dec. 7, 2022 to Final Office Action mailed Sep. 7, 2022", 9 pgs.

STREAMS USING PERSISTENT TABLES

CROSS-REFERENCE TO RELATED APPLICATIONS

This application is a Continuation of U.S. patent application Ser. No. 17/648,622 filed Jan. 21, 2022, which claims the benefit of priority to U.S. Provisional Patent Application Ser. No. 63/143,184 filed Jan. 29, 2021, the contents of which are incorporated herein by reference in their entireties.

TECHNICAL FIELD

The present disclosure generally relates to a network-based database system and, more specifically, to generating change data capture determinations, such as streams or virtual tables, using persistent tables (also referred to as system tables).

BACKGROUND

Network-based database systems may be provided through a cloud platform, which allows organizations and users to store, manage, and retrieve data from the cloud. With respect to type of data processing, a database system could implement online transactional processing, online analytical processing, a combination of the two, and/or another type of data processing. Moreover, a database platform could be or include a relational database management system and/or one or more other types of database management systems.

One such example is a cloud data warehouse (also referred to as a "network-based data warehouse" or simply as a "data warehouse"), which is a network-based system used for data analysis and reporting that comprises a central repository of integrated data from one or more disparate sources. A cloud data warehouse can store current and historical data that can be used for creating analytical reports for an enterprise. To this end, data warehouses can provide business intelligence tools, tools to extract, transform, and load data into the repository, and tools to manage and retrieve metadata.

In some instances, a user of the network-based data warehouse may wish to analyze different aspects of the table, such as changes or modifications made to the table. A virtual table (or stream) can be used for such purposes. But because these virtual tables are tied to the underlying table, their functionality can be limited. Moreover, these virtual tables can also reveal data (or the existence of such data) that was removed due to privacy compliance requests.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques described herein can employ system tables for change data capture determinations, such as stream reads. A system (or persistent) table may be generated storing changelog information of a primary base table. The system table may be used to create streams of relevant information. In some examples, the streams may read from the system table for information past a retention period of the primary table while reading from the primary table information in the retention period. The system table can also be used for other applications, such as primary table replication.

Figure 1:
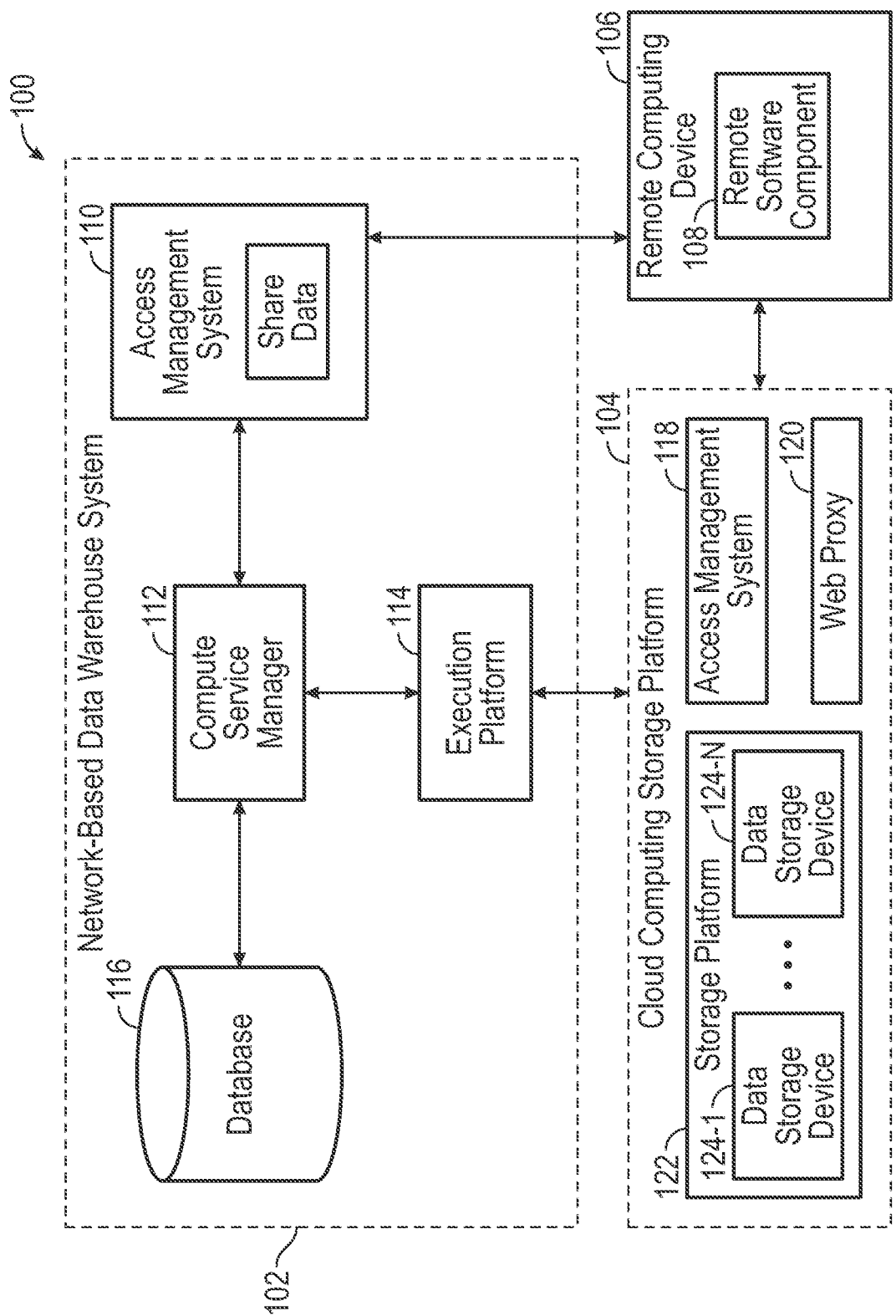
FIG. 1 illustrates an example computing environment in which a network-based data warehouse system, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-*n* that are part of a cloud computing storage platform 104. In some embodiments, data storage devices 124-1 to 124-*n* are cloud-based storage devices located in one or more geographic locations. For example, data storage devices 124-1 to 124-*n* may be part of a public cloud infrastructure or a private cloud infrastructure. Data storage devices 124-1 to 124-*n* may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-*n* supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-*n* in the cloud computing storage platform 104. Thus, the computing resources and cache resources are not restricted to specific data storage devices 124-1 to 124-*n*. Instead, all computing resources and all cache resources may retrieve data from, and store data to, any of the data storage resources in the cloud computing storage platform 104.

Figure 2:
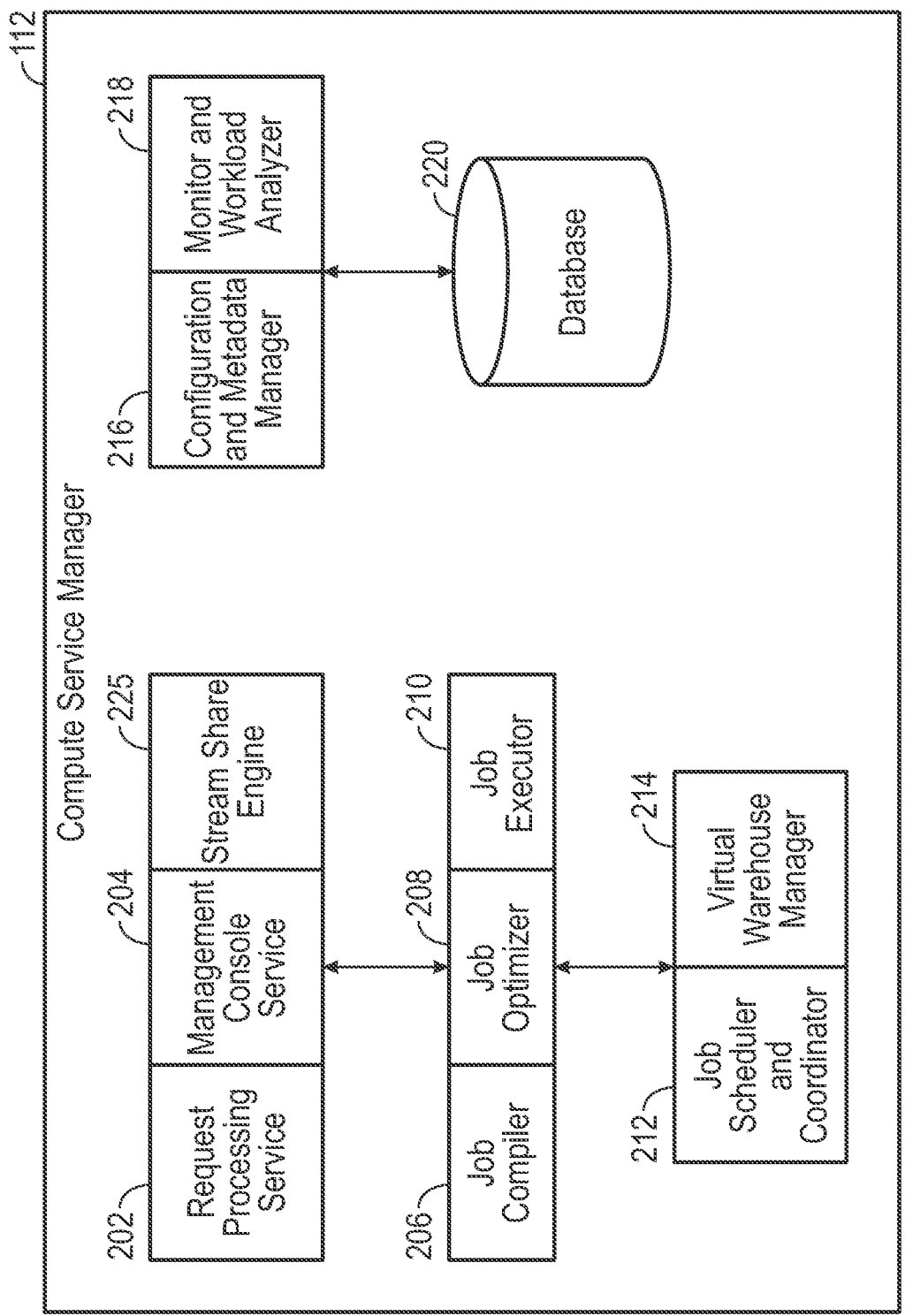
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
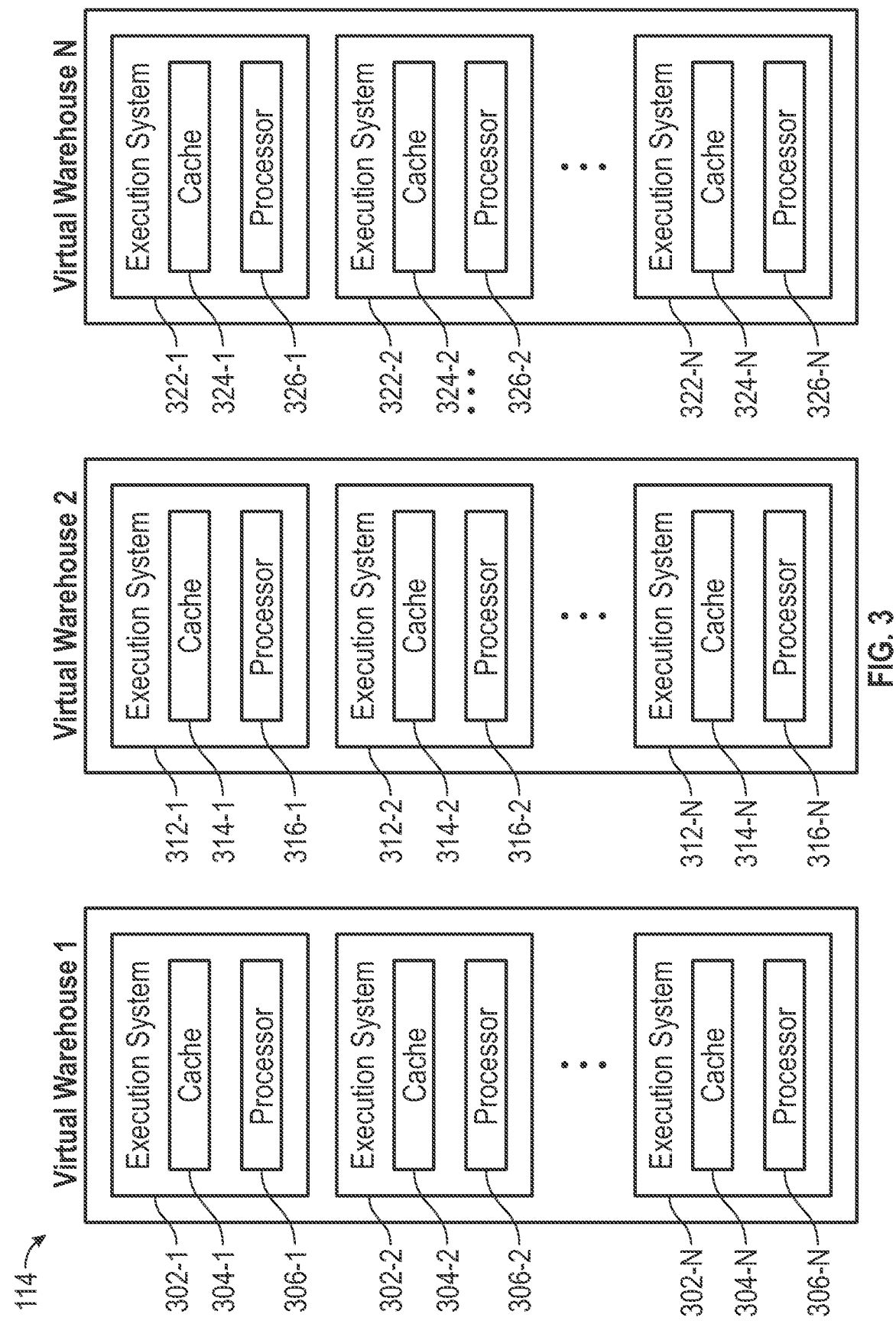
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
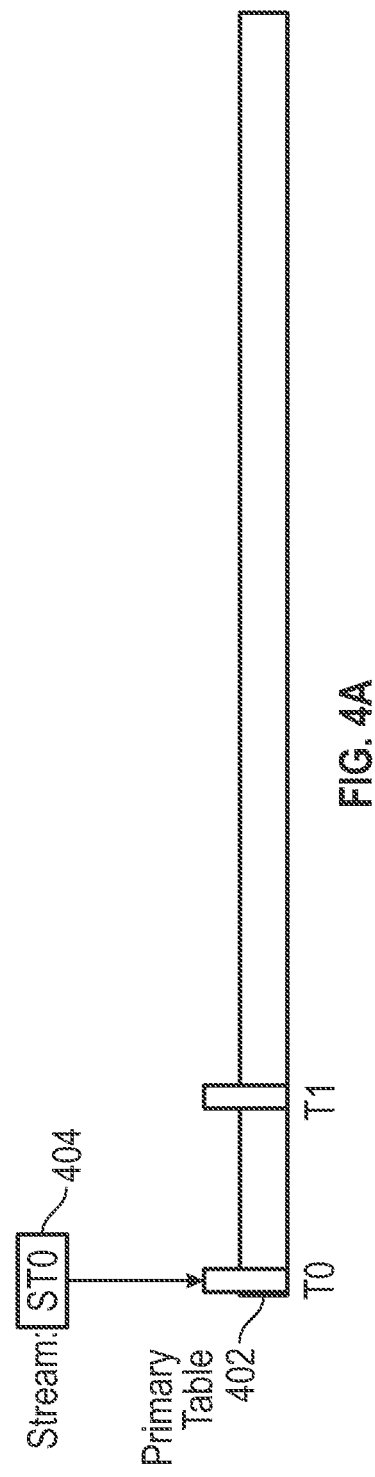
FIGS. 4A-B show examples of stream generation, according to some example embodiments.

Next, techniques for generating change capture determinations, such as streams, are described. FIG. 4A shows an example of a stream generation, according to some example embodiments. A primary table 402 (also referred to as a base table) may be provided. The primary table 402 may store a set of data, for example customer data for a client. In some embodiments, the primary table 402 may be implemented as a view, which allows a result of a query to be accessed as if it were a table. In some embodiments, the primary table 402 may be implemented as a set of tables.

The primary table 402 is illustrated as having two versions: T0 and T1. The versions may reflect changes (or modifications), such as data manipulation language (DML) operations executed on the primary table 402.

Data in the primary table 402 may automatically be divided into an immutable storage device referred to as a micro-partition. A micro-partition may be an immutable storage device in a database table that cannot be updated in-place and must be regenerated when the data stored therein is modified. A micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

A stream 404 (ST0) may be generated. A stream is a virtual table showing change data capture (CDC) information between two points. Here, stream 404 (ST0) may show the CDC information between T0 and T1 table versions. Being a virtual table, the stream does not store information itself, but instead includes pointers to the underlying information. In this example, the stream 404 (ST0) includes a set of pointers to the primary table 402. Multiple streams may be generated for different points of time.

Figure 4B:
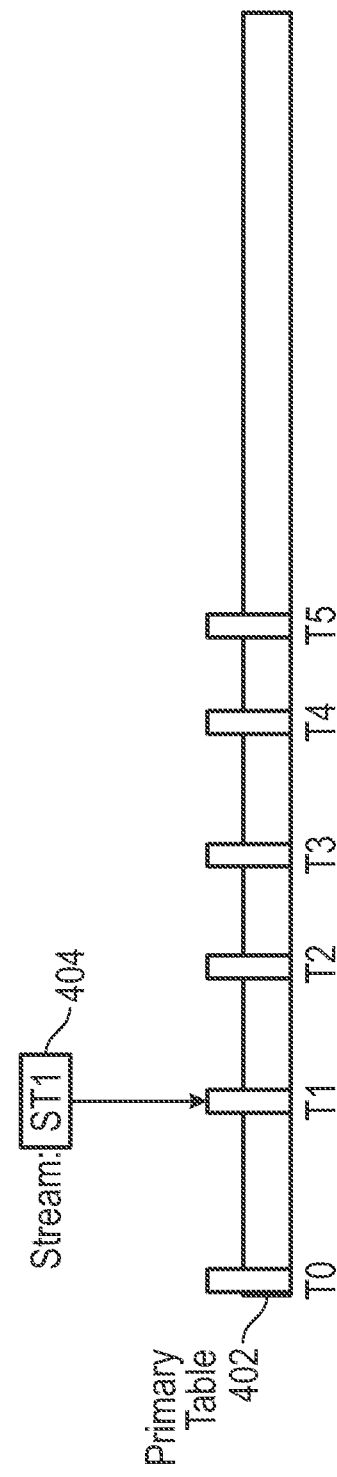

Over time, more changes may be executed on the primary table. FIG. 4B shows another example of stream generation, according to some example embodiments. Here, the primary table 402 may now have additional versions T2-T5 in addition to the previous two versions T0 and T1. The stream 406 (ST1) is pointing to old table version T1, though. The data in version T1 of the primary table 402 may become stale or may exceed a data retention time of the primary table, causing data reliability issues. Hence, if the data is retained for an extended period of time due to the presence of a stream (e.g., stream 404), it may cause compliance issues with privacy regulations, such as GDPR (General Data Protection Regulation). Privacy regulations, such as GDPR, can require deletion of personal data from data systems upon requests or other triggering events. If data is retained for too long in old versions of a table, it may run into compliance issues with such privacy regulations.

Therefore, a system table (also referred to as a persistent table herein) may be generated to store CDC information of the primary table. The system table may be a physical table in an optimized format, which stores or persists information. The system table may store changelog information (e.g., delta information) related to the modifications of the primary table. In some examples, the streams may then refer and point to the system table instead of the primary table or in some examples, streams may refer to both the system and primary tables, as described in further detail below.

CDC information may be piped into the system table when there is a change event (e.g., DML) in the primary table. Reads from the stream may then use the system table. Moreover, for DMLs issued on the database to ensure compliance with different regulations, sensitive information can be deleted from the primary table and the system table in an efficient manner, as described in further detail below.

Figure 5:
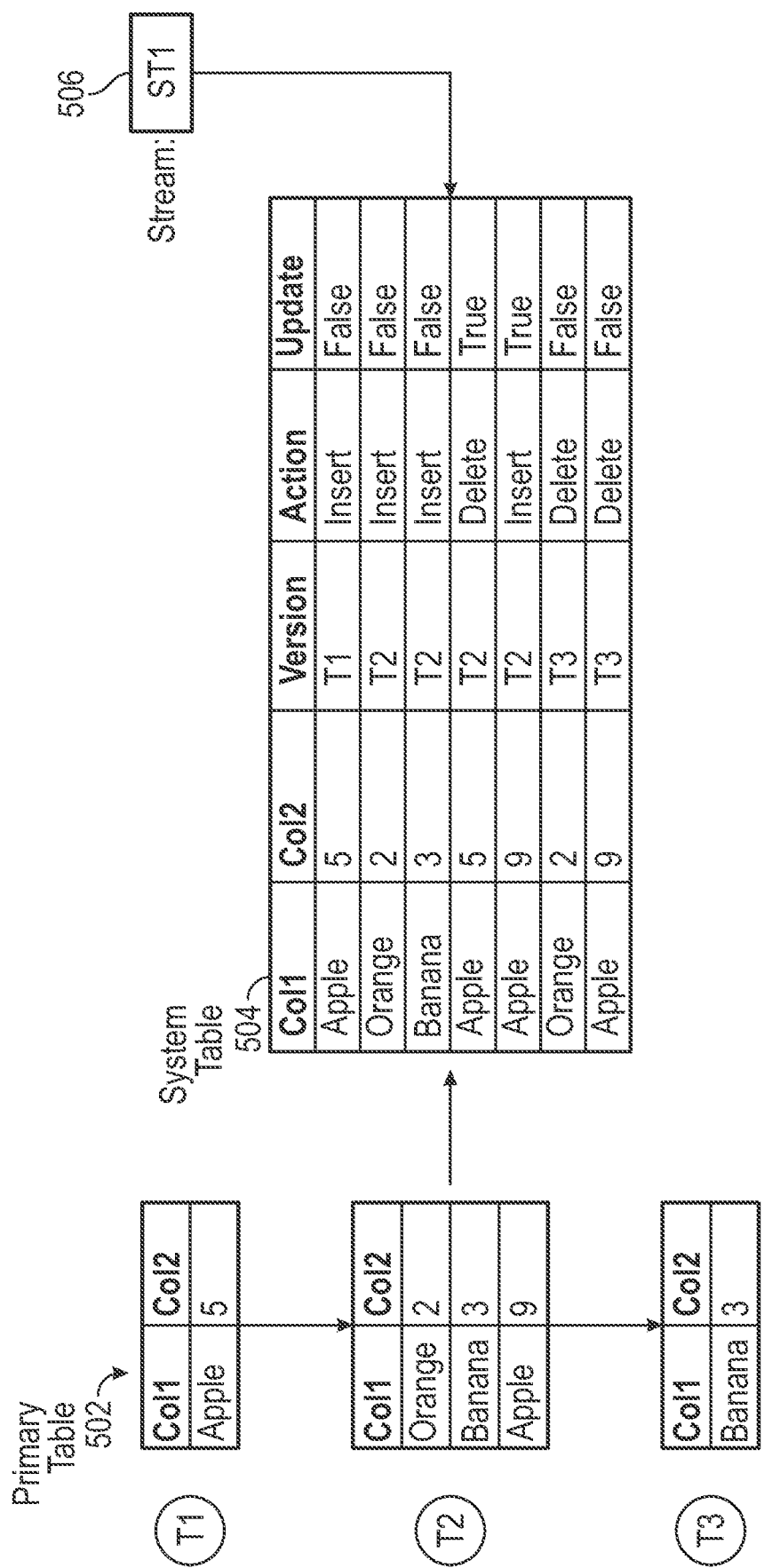
FIG. 5 shows a system table, according to some example embodiments.

FIG. 5 shows generating a system table, according to some example embodiments. Here, primary table 502 includes three different versions: T1, T2, and T3. The data changes in these different versions are captured in a system table 504. For example, when a DML operation is executed on the primary table 502, corresponding change information may be stored in the system table 502. The system table 502 may store only change information, thus reducing the use of storage resources and thus reducing overhead.

For example, in version T1, a row with entry "apple" for column 1 and "5" for column 2 is inserted in the primary table 502. In the system table 504, information regarding this row insertion is stored. For example, in addition to the row information (such as the column values) and the primary table version information, the system table 504 may also store information regarding the action (e.g., DML operation) that caused the change and whether that action was performed as part of an update. If a row is modified, the system table 504 may record the update using a combination of operations. For example, in version T2, the previously discussed row with values "apple" and "5" is modified to "9". This change is recorded in the system table 504 with two entries: 1) the row with values "apple" and "5" as being deleted and being part of an update operation (Update column=TRUE), and 2) a new row with values "apple" and "9" being inserted and being part of an update operation (Update column=TRUE).

Streams, such as stream 506 (ST1), may utilize the system table 504 for reading. For example, streams may be generated based on the delta information stored in the system table. The streams may include pointers to the system table. Different types of streams may be supported by the system table. For example, a net delta stream may be supported showing the changes between two points of time. However, if multiple changes are made to a row during those two points of time, the intermediate changes may not be shown in the net delta stream, only the initial and final values. A full changelog stream, however, may show all changes between two points of time. Both net delta and changelog streams may be supported by the system table.

Figure 6:
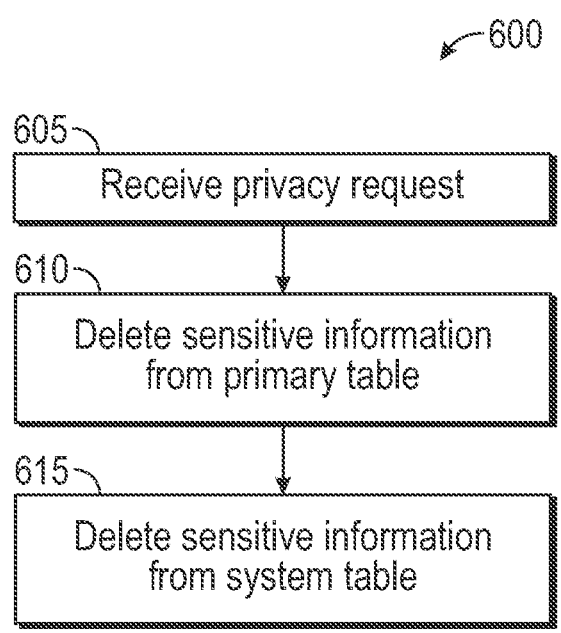
FIG. 6 shows a flow diagram for processing a privacy request, according to some example embodiments.

FIG. 6 shows a flow diagram illustrating a method 600 for processing a privacy request, according to some example embodiments. At operation 605, a privacy request may be received. The privacy request may include a compliance request for a privacy regulation. For example, the privacy request may include a request to delete information for a particular customer. At operation 610, sensitive information related to the privacy request may be identified and deleted from the primary table. For example, a delete command for the sensitive information may be executed for the primary table. Micro-partitions including the sensitive information may be deleted from the primary table, and new micro-partitions may be generated in the primary table excluding rows that contained the sensitive information.

At operation 615, the sensitive information related to the privacy request may be identified and deleted from the system table. To do so, a delete command may be issued for any related streams, which may in turn explicitly delete the sensitive information from the system table. For example, an explicit stream delete command may be executed for the system table. Thus, the streams may be updated without leaving traces or indications that the sensitive information was present and then deleted.

In some example embodiments, a hybrid approach of creating streams may be utilized. In this hybrid approach, certain streams may read from the system table and the primary table. For example, streams may read from the system table for information past a retention time of the primary table and may read the primary table for information before the retention time. The stream may then combine or merge the information from the system and primary tables to generate the stream output.

Figure 7:
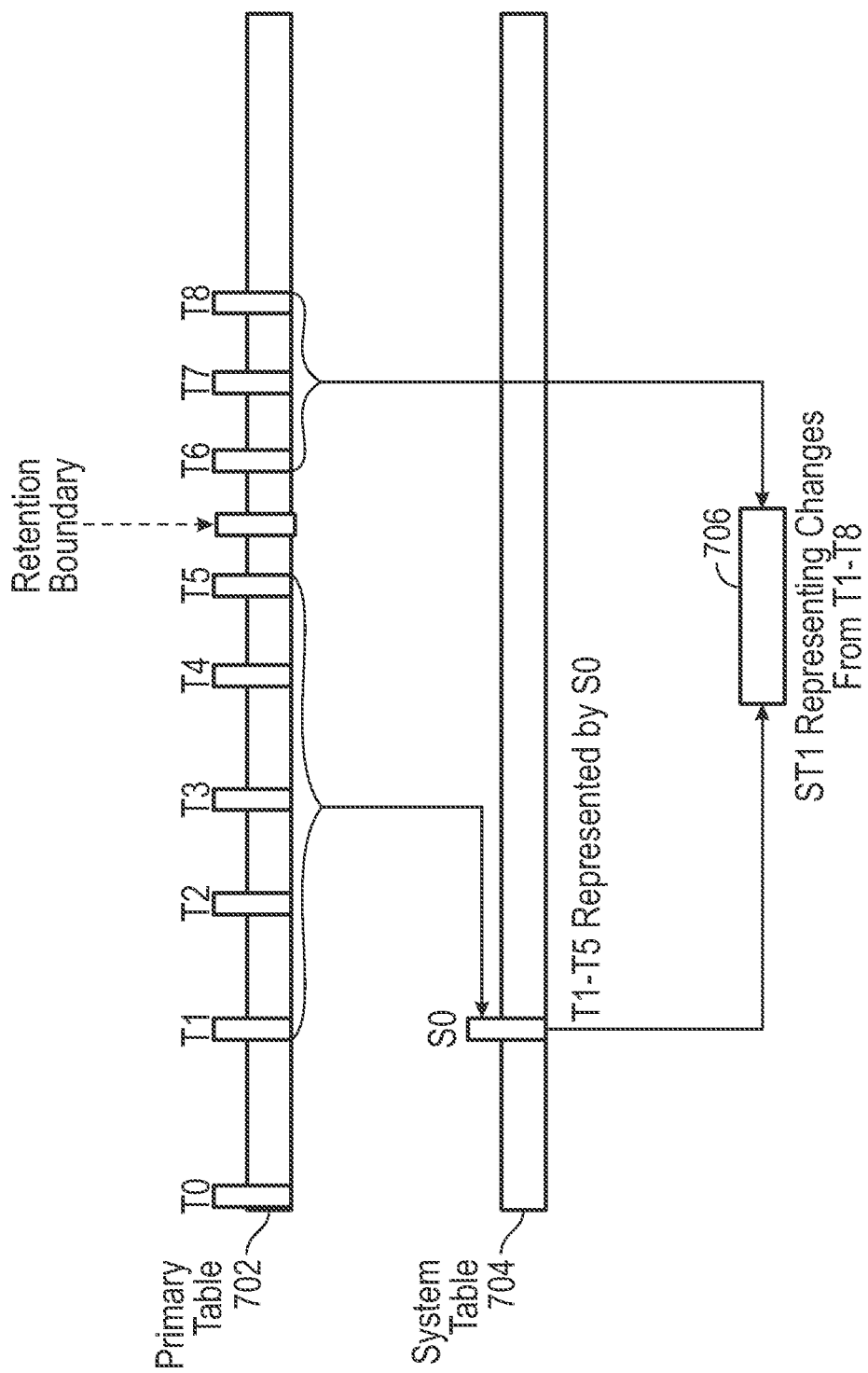
FIG. 7 illustrates an example of a stream generation using a hybrid approach, according to some example embodiments.

FIG. 7 illustrates an example of a stream generation using a hybrid approach, according to some example embodiments. Here, the primary table 702 includes different versions, T0-T8. Versions T0-T5 are past a retention boundary of the primary table 702 and therefore may be deleted. The retention boundary may be configurable and may be set by an administrator.

A system table 704 may be generated to store changes in select versions of the primary table 702. Changes in versions T1-T5 of the primary table 402 may be captured in version S0 of the system table 704. In this example, versions T6-T8 are before the retention boundary of the primary table 702. Consider, a stream being requested for information related to versions T1-T8 of the primary table 702, but as mentioned above, versions T1-T5 may be deleted since they are past the retention time. A stream 706 (ST1) may read from the system table 704, e.g., S0, for change information from versions T1-T5, and the stream 706 may read from the primary table 702 for information from versions T6-T8. Therefore, primary table versions T0-T5 can be deleted and not retained, for example to comply with privacy regulations, without losing relevant information that is now stored in the system table 702, which can be used to generate streams. This may allow reduction of the retention time of storing prior versions of the primary table and thus reducing storage overhead.

Figure 8A:
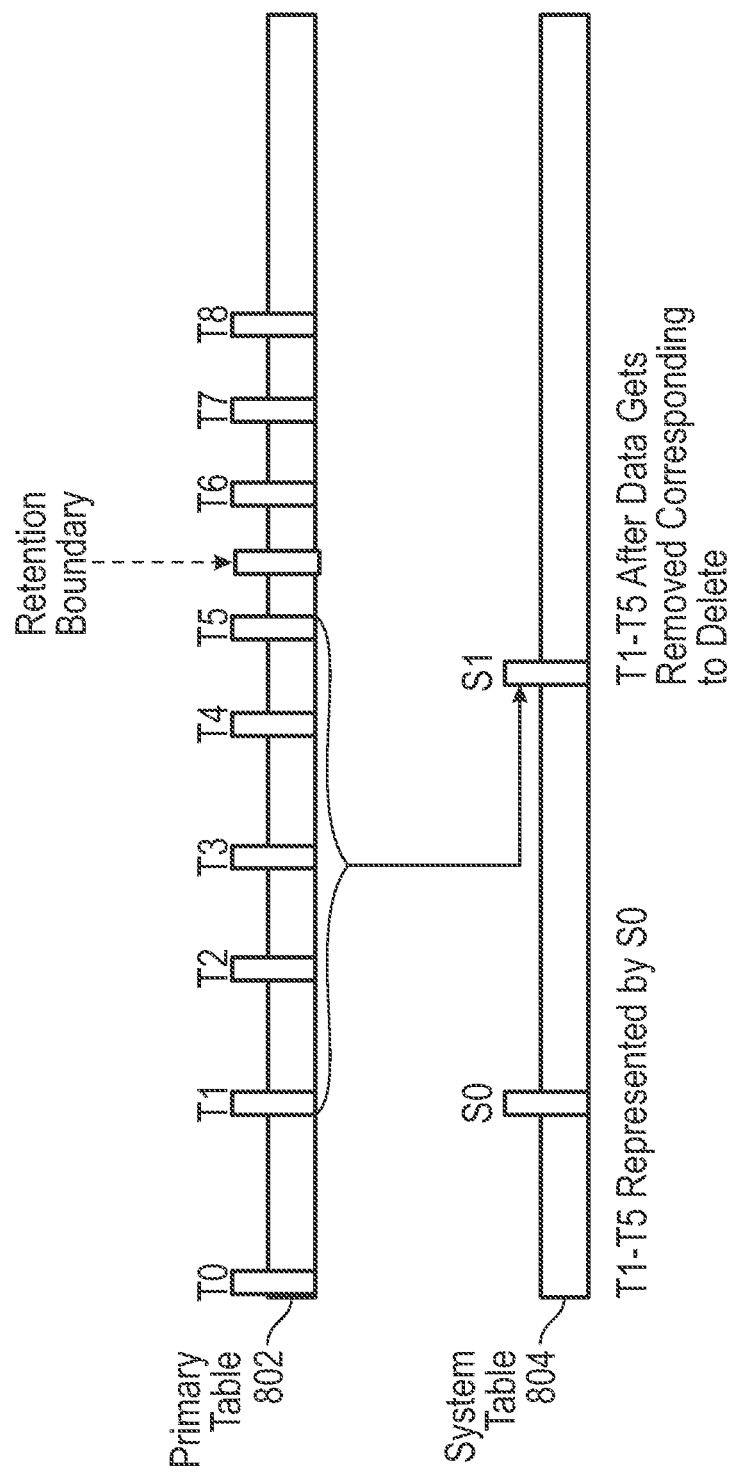
FIGS. 8A-8C illustrate different system table and stream generation scenarios, according to some example embodiments.
Figure 8B:
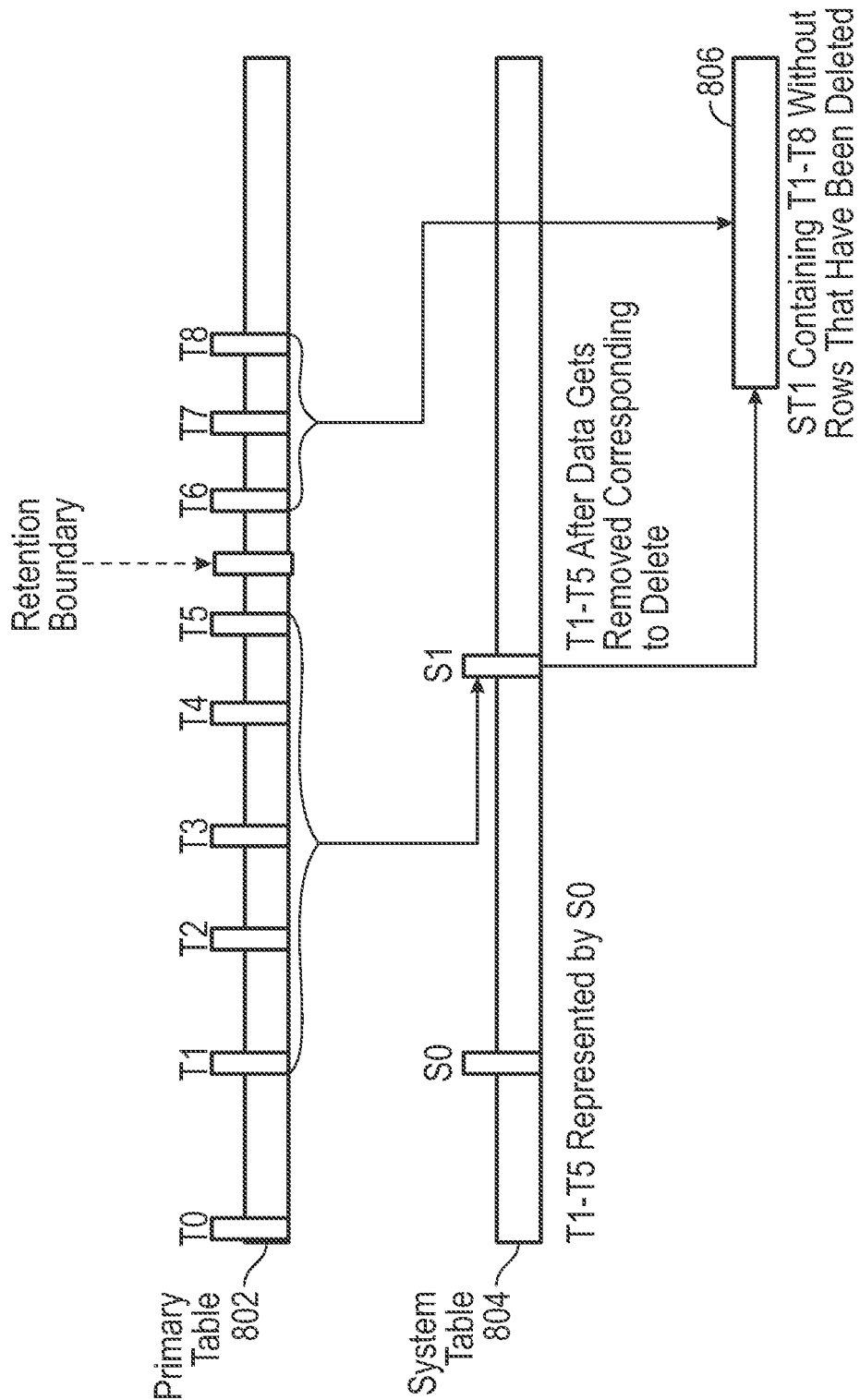
Figure 8C:
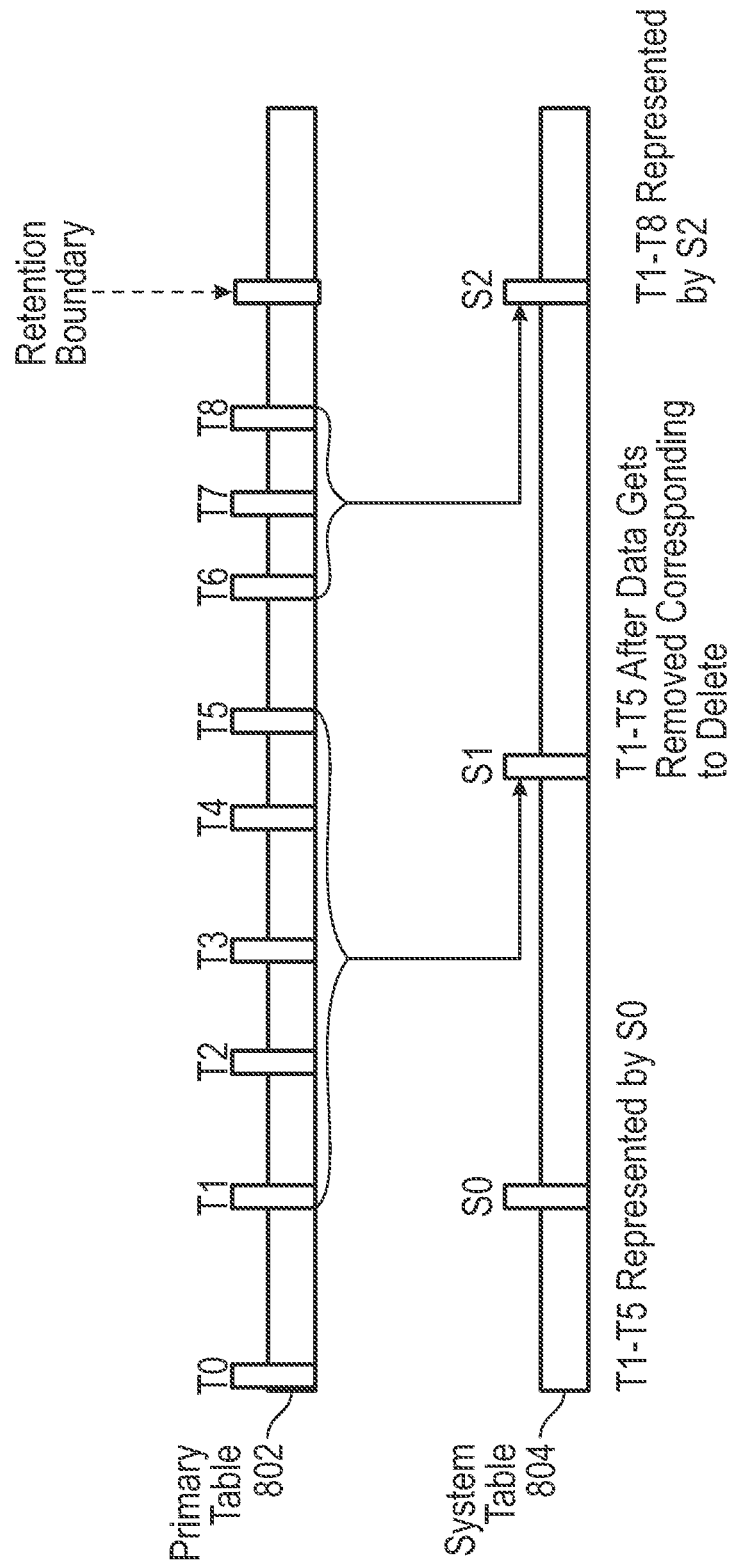

FIGS. 8A-8C illustrate different system table and stream generation scenarios, according to some example embodiments. FIG. 8A shows a primary table 802 with versions T0-T5 past a retention boundary and versions T6-T8 before the retention boundary. A system table 804 is also illustrated. Version S0 of the system table 804 represents the changes in the primary table in versions T1-T5. However, consider that sensitive information is deleted in the primary table 802 and system table 804 in response to a compliance request, as discussed above with reference to FIG. 6. Hence, version S1 of the system table 804 may be generated in response representing changes in primary table versions T1-T5 after sensitive information has been removed corresponding to one or more delete functions.

FIG. 8B illustrates an example of a stream generation using a hybrid approach, according to some example embodiments. Version S1 is the system table 804 after sensitive information has been removed, as discussed above with reference to FIG. 8A. Here, system table 51 may be used instead of S0 for the stream generation. Thus, a stream 806 may read from the system table 51 for information from T1-T5 of the primary table 802 (after data removal) past the retention boundary, and the stream 806 may also read from the primary table 802 for information from T6-T8, which are before the retention boundary.

FIG. 8C illustrates the progression of a system table, according to some example embodiments. Here, versions T6-T8 of the primary table 802 are now past the retention boundary. Thus, information from T6-T8 may be merged with the system table 804, and a new system table version S2 may be generated accordingly.

The system table techniques described herein may find different applications. For example, the system table may enable more efficient garbage collection functions. Because information regarding older data from the primary table may be stored in the system table (as delta information), older versions of the primary table may be removed more readily. As another example, replication may be performed by using the delta information stored in the system table. The change information in the system table may be used to replicate the primary table or a portion thereof.

Using a system table as described herein may provide different advantages. For example, data retention may be set to a lower time without compromising access of older data for stream generation. Streams may also be managed more robustly. For example, streams, using system table techniques described herein, may be managed on a per-stream basis (e.g., with DDL) rather than all streams being affected by, for example, a DML. Sensitive information may be more protected in the streams. For example, query executions read from a stream may not disclose sensitive information. Performance can also be improved. Streams may be generated faster by reading from the system table. By using optimized data format for the system table, storage resources may be conserved lowering storage costs.

Figure 9:
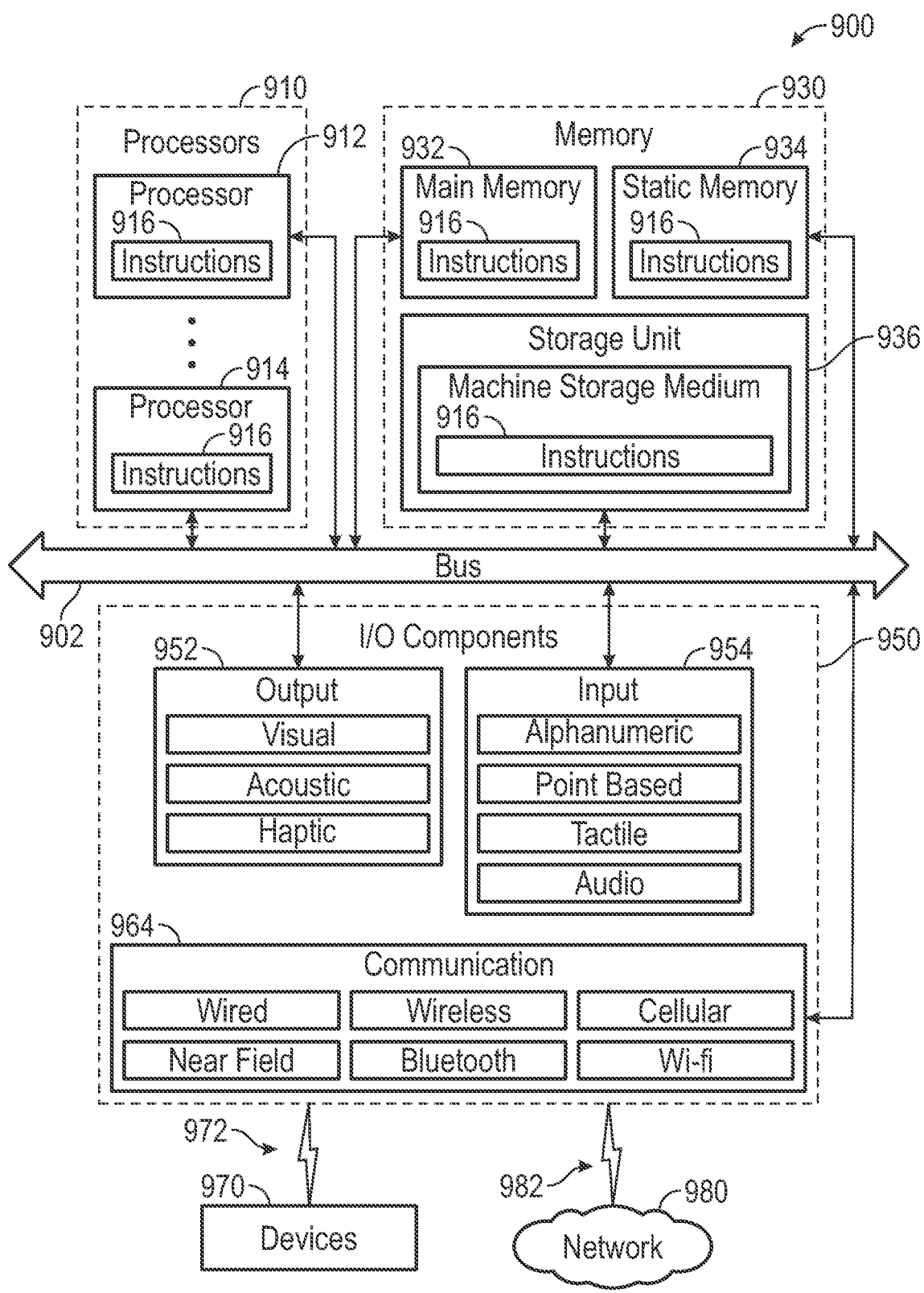
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implement portions of the data flows described herein. In this way, the instructions 916 transform a general, non-programmed machine into a particular machine 900 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954.

The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 110, the compute service manager 112, the execution platform 114, the access management system 118, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended examples, along with the full range of equivalents to which such examples are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended examples, the terms "including" and "in which" are used as the plain-English equivalents of the respective terms "comprising" and "wherein." Also, in the following examples, the terms "including" and "comprising" are open-ended; that is, a system, device, article, or process that includes elements in addition to those listed after such a term in an example is still deemed to fall within the scope of that example.

Described implementations of the subject matter can include one or more features, alone or in combination as illustrated below by way of example.

Example 1. A method comprising: providing a primary table storing a set of data; executing modifications to the primary table; generating a system table storing delta information related to the modifications to the primary table; and based on the delta information, generating change data capture information including one or more pointers to the system table.

Example 2. The method of example 1, wherein the change data capture information includes a virtual table with the one or more pointers to the system table.

Example 3. The method of any of examples 1-2, further comprising: defining a retention boundary for the set of data stored in the primary table; deleting data past the retention boundary in the primary table; wherein the system table stores delta information related to modifications executed past the retention boundary.

Example 4. The method of any of examples 1-3, wherein the change data capture information includes one or more pointers to the system table for information past the retention boundary and one or more pointers to the primary table for information before the retention boundary.

Example 5. The method of any of examples 1-4, further comprising: in response to a request, deleting identified information from the primary table and deleting identified information from the system table.

Example 6. The method of any of examples 1-5, wherein deleting identified information from the system table includes executing a delete command on the change data capture information.

Example 7. The method of any of examples 1-6, further comprising: replicating a portion of the primary table using the delta information stored in the system table.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:

1. A method comprising:
storing a first table including a set of data in a network-based data system, the first table including a retention boundary for the set of data;
executing, by at least one hardware processor, modifications to the first table;
deleting data from the set of data in the first table past the retention boundary;
storing a second table including delta information related to the modifications executed past the retention boundary to the first table in a different format than the first table; and
generating change data capture information for the first table including a virtual table with one or more pointers to the second table for delta information related to modifications past the retention boundary and one or more pointers to the first table for data before the retention boundary.

2. The method of claim 1, in response to a request, deleting identified information from the first table and deleting identified information from the second table.

3. The method of claim 2, wherein deleting identified information from the second table includes executing a delete command on the change data capture information.

4. The method of claim 1 further comprising:
replicating a portion of the first table using the delta information stored in the second table.

5. The method of claim 1, wherein the first table stores the set of data in a plurality of partitions.

6. The method of claim 5, wherein executing modifications includes deleting a first partition of the plurality of partitions and adding a new partition representing a change to the first partition based on the modifications.

7. A system comprising:
at least one hardware processor; and
at least one memory storing instructions that, when executed by the at least one hardware processor, cause the at least one hardware processor to perform operations comprising:
storing a first table including a set of data in a network-based data system, the first table including a retention boundary for the set of data;
executing modifications to the first table;
deleting data from the set of data in the first table past the retention boundary;
storing a second table including delta information related to the modifications executed past the retention boundary to the first table in a different format than the first table; and
generating change data capture information for the first table including a virtual table with one or more pointers to the second table for delta information related to modifications past the retention boundary and one or more pointers to the first table for data before the retention boundary.

8. The system of claim 7, in response to a request, deleting identified information from the first table and deleting identified information from the second table.

9. The system of claim 8, wherein deleting identified information from the second table includes executing a delete command on the change data capture information.

10. The system of claim 7, further comprising:
replicating a portion of the first table using the delta information stored in the second table.

11. The system of claim 7, wherein the first table stores the set of data in a plurality of partitions.

12. The system of claim 11, wherein executing modifications includes deleting a first partition of the plurality of partitions and adding a new partition representing a change to the first partition based on the modifications.

13. A non-transitory machine-storage medium embodying instructions that, when executed by a machine, cause the machine to perform operations comprising:
storing a first table including a set of data in a network-based data system, the first table including a retention boundary for the set of data;
executing modifications to the first table;
deleting data from the set of data in the first table past the retention boundary;
storing a second table including delta information related to the modifications executed past the retention boundary to the first table in a different format than the first table; and
generating change data capture information for the first table including a virtual table with one or more pointers to the second table for delta information related to modifications past the retention boundary and one or more pointers to the first table for data before the retention boundary.

14. The non-transitory machine-storage medium of claim 13, in response to a request, deleting identified information from the first table and deleting identified information from the second table.

15. The non-transitory machine-storage medium of claim 14, wherein deleting identified information from the second table includes executing a delete command on the change data capture information.

16. The non-transitory machine-storage medium of claim 13, further comprising:
replicating a portion of the first table using the delta information stored in the second table.

17. The non-transitory machine-storage medium of claim 13, wherein the first table stores the set of data in a plurality of partitions.

18. The non-transitory machine-storage medium of claim 17, wherein executing modifications includes deleting a first partition of the plurality of partitions and adding a new partition representing a change to the first partition based on the modifications.

* * * * *